Figure 1:
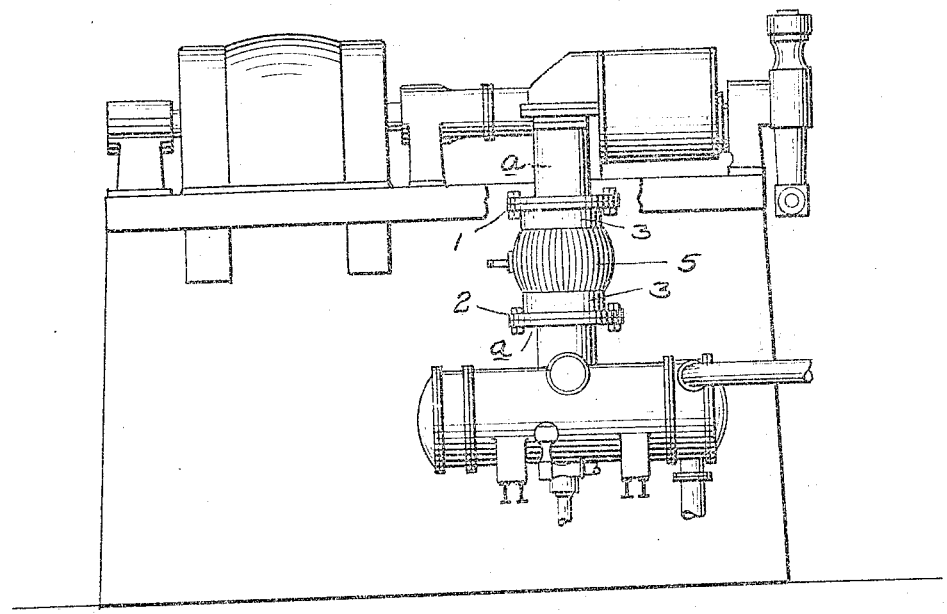

Nov. 27, 1923.

A. P. DIESCHER 1,475,288

EXPANSION JOINT

Filed Jan. 16, 1922

2 Sheets—Sheet 1

WITNESSES
J. Herbert Bradley.

INVENTOR
August P. Diescher
by Darwin S. Wolcott
Atty

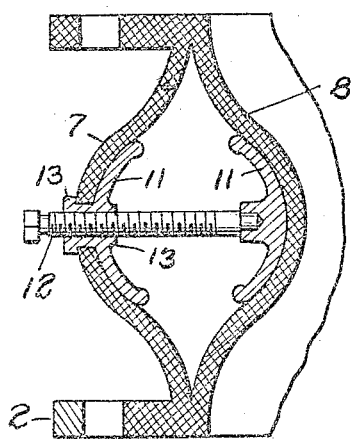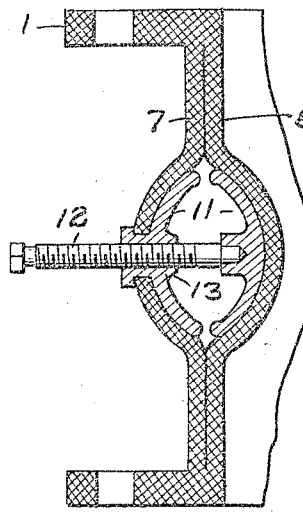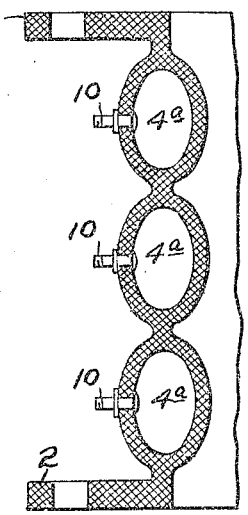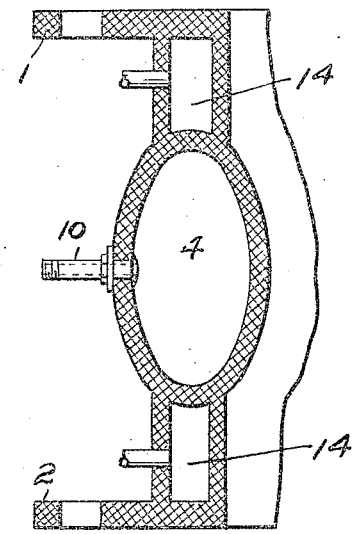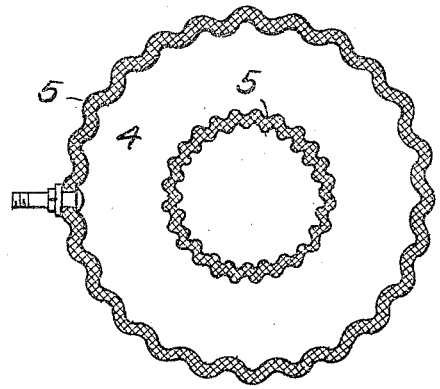

Patented Nov. 27, 1923.

1,475,288

UNITED STATES PATENT OFFICE.

AUGUST P. DIESCHER, OF PITTSBURGH, PENNSYLVANIA, ASSIGNOR TO S. DIESCHER & SONS, A PARTNERSHIP CONSISTING OF SAMUEL E. DIESCHER AND AUGUST P. DIESCHER.

EXPANSION JOINT

Application filed January 16, 1922. Serial No. 529,693.

*To all whom it may concern:*

Be it known that I, AUGUST P. DIESCHER, residing at Pittsburgh, in the county of Allegheny and State of Pennsylvania, a citizen of the United States, have invented or discovered certain new and useful Improvements in Expansion Joints, of which improvements the following is a specification.

It is frequently necessary to embody in lines of pipes or conduits conducting fluids, sections adapted not only to permit of a lateral movement of one portion of the conducting means relative to another portion, but also to permit of longitudinal movement of one portion relative to another due to changes of temperature. Surrounding conditions may render it exceedingly difficult to renew the joint or section, as for example, in Fig. 1 of the drawing is shown diagrammatically a flexible and expansible joint or section connecting a steam turbine with the exhaust pipe leading to the condenser. In very many installations it is necessary to practically dismantle the turbine when it becomes necessary to replace the joint or section, it being impossible to remove an old and defective joint laterally and insert a new one in the same manner, for the reason that the distance between the flanges of the exhaust nozzle of the turbine and the pipe leading to the condenser is so nearly that between the faces of the flanges of the joint or section that packing, i. e., gaskets or washers, could not be moved in with the section nor inserted after the section is in position.

The invention described herein has for its object a construction of joint or section having its ends so constructed as to be capable of being secured to adjacent portions of devices to be connected in combination with a shell or side wall connecting the end portions adapted to have portions so displaced that the distance between the end portions is so reduced to permit of the joint being slid easily between the fixed parts to which the ends of the joint are to be connected. The invention is hereinafter more fully described and claimed.

Figure 2:
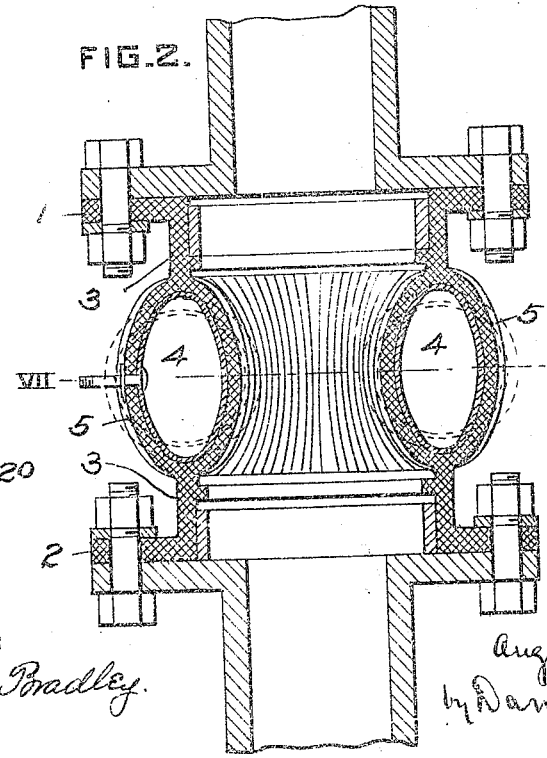
Figure 8:
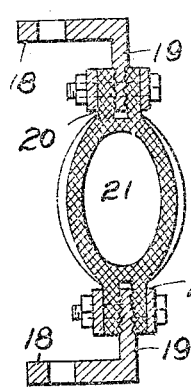
Figure 9:
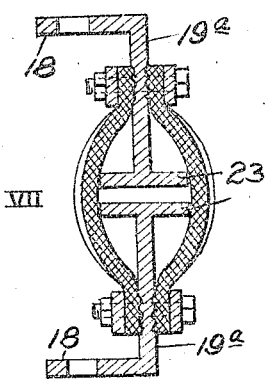

In the accompanying drawings forming a part of this specification, Fig. 1 is a diagrammatic view of a steam turbine and showing my improved joint or section connecting the exhaust nozzle of the turbine with the pipe leading to a condenser; Fig. 2 is a sectional elevation of the joint or section on an enlarged scale; Figs. 3 and 4 are sectional views of a modified construction showing respectively the joint reduced in length preparatory to its being placed in position and as restored to normal size or the length it will have when placed in position; Figs. 5 and 6 are sectional detail views of portions of joints illustrating modifications of the improvement; Fig. 7 is a sectional plan view on a plane indicated by the line VII—VII, Fig. 2; Figs. 8 and 9 are sectional views of portions of a joint illustrating a modification of the construction.

In the construction shown in Figs. 1 to 7 the improved joint is formed of rubber and consists of flanges 1 and 2, whereby the joint may be secured to adjacent parts and a circular wall or shell 3 connecting said flanges. This wall is so constructed that an annular chamber 4 is formed therein. The walls of this chamber are made with sufficient flexibility and resilience that they may be distorted by internal pressure, the distortion being in the direction at an angle to the axis of the joint or section or in any direction as to cause the flanges 1 and 2 to move towards one another. It is preferred that the walls 5 of the annular chamber should be corrugated as shown in Figs. 2 and 7 to facilitate the movements of the walls when subjected to internal pressure. In the construction shown in Figs. 2, 5 and 6, the side walls 5 are formed integral with rings or collars 3, which in turn are formed integral with the flanges. These side walls are preferably so shaped and proportioned that the annular chamber will be oval in cross section with shorter axis at an angle preferably a right angle to the axis of the joint or section; when these side walls are subjected to internal pressure they will be forced away from one another or bulged in diametrically opposite directions, as indicated by dotted lines in Fig. 2, thereby pulling the flanges toward one another or decreasing the length of the joint. The curvature of the walls of the chamber will permit of changes in the length of the joint or section when subjected to stresses applied to directions parallel or substantially parallel with the axis of the joint or section.

As shown in Figs. 3 and 4 the circular wall of the shell connecting the flanges may be formed of two sections, or parts, 7 and 8, throughout its entire extent, so that when oppositely acting pressures are exerted between said parts there will be a flexure of both walls, said flexure increasing in extent from the lines of junction where the walls merge into and become integral with the solid flanges. While not necessary it is preferred that both members should be circumferentially bulged as at 9 to facilitate movement of the flanges towards and from each other.

The bulging out of the side walls of the chamber to cause a shortening of the joint or section may be effected by fluid pressure introduced through a tube 10 as shown in Figs. 1 and 2. Or in lieu of fluid pressure the walls of the chamber may be forced outward by mechanical means as shown in Fig. 3 and Fig. 4. A suitable means for that purpose consists of two bands 11 formed in sections and a screw 12 for each pair of sections. An internally threaded boss or projection 13 is formed on one section of each pair and projects through the outer wall of the chamber. The screws 12 pass through the bosses and their inner ends bear against the other section of the respective pairs. The wall of the joint may be formed with passages 14 for circulation of a cooling medium to prevent injurious heating of the joint or section as shown in Fig. 6.

When a movement of the flanges towards each other greater than can be conveniently effected by the shifting of the walls of a single chamber is desired, a plurality of such chambers 4ª may be employed as shown in Fig. 5.

As shown in Figs. 8 and 9, the joint may consist of rigid metal sections and a chamber, the walls of which connect the sections. In the construction shown in Fig. 8 the metal portions consist of annular flanges 18 and annular walls 19 connected to ribs 20 formed on opposite sides of an annular chamber 21, formed of rubber or other suitable material. In the construction shown in Fig. 9 the annular walls 19ª extend into the chamber which are formed by bands of rubber having their edges secured to opposite sides of the walls 19ª which are provided with heads or enlargements 23 adapted to prevent collapsing of the chamber by external pressure.

When it becomes necessary to replace an expansive joint or section, the old one is removed in suitable manner and the new joint which is made of the proper size is shortened in the manner hereinbefore described to permit of its being easily slid into position, and the bolt holes in the flanges 1 and 2 brought into alignment with those in the flanges to which the ends of the joint are to be secured. The joint is then permitted to return to its normal size, i. e., length, and is bolted in place.

When the improved coupling is subjected to a temperature injurious to the flexible portion thereof, any cooling fluid may be introduced through the nozzle 10.

I claim herein as my invention:

1. The method herein described of inserting a joint or coupling having a longitudinally and laterally yielding side wall between relatively fixed members of a fluid conductor, which consists in applying pressure to the side wall to reduce the joint to a length less than the distance between the fixed members of the fluid conductor, placing the joint between fixed members and relieving the side walls of pressure to permit the joint to increase in length and bring its ends in contact with the fixed members of the fluid conductor.

2. A joint or section consisting of end flanges and a wall connecting the flanges, said wall being provided with an annular chamber having yielding side walls, and means for applying pressure within said chamber, to cause a lateral movement of the side walls thereof.

3. A joint or section consisting of end flanges and a circular wall formed of rubber connecting said flanges, said wall being provided with an annular chamber, the side walls of the chamber being adapted to be shifted in directions at an angle to the axis of the joint.

4. The method herein described of inserting an annular joint or a coupling having a resilient side wall between relatively fixed members of a fluid conductor which consists in reducing the length of the joint or coupling by laterally flexing the side wall, placing it while so reduced in length between such fixed members and allowing it to return to normal length.

5. A joint or coupling having annular end flanges and laterally yielding side wall in combination with means for causing a lateral flexure of the side wall to reduce the normal distance between the flanges.

6. A joint or coupling consisting of annular end flanges and a wall connecting said flanges, said wall being provided with an annular chamber having yielding side walls in combination with means for applying pressure within said chamber to cause an outward movement of the side walls thereof and means for preventing a collapsing or inward movement of the side walls.

7. A joint or coupling consisting of annular end flanges and a wall connecting said flanges, said wall being provided with an annular chamber having its walls corrugated in the direction of the axis of the joint and means for applying pressure within said chamber to cause a lateral movement of the side walls thereof.

8. A joint or coupling consisting of annular flanges and cylindrical section having its side walls corrugated in the direction of the axis of the section and connected to the respective flanges, and means for causing a lateral movement of the walls of the cylindrical section and thereby effecting a change in the distance between the flanges.

In testimony whereof, I have hereunto set my hand.

AUGUST P. DIESCHER.